United States Patent
Hamajima et al.

(10) Patent No.: US 12,462,576 B2
(45) Date of Patent: Nov. 4, 2025

(54) MODEL GENERATION METHOD, MODEL GENERATION APPARATUS, NON-TRANSITORY STORAGE MEDIUM, MOBILE OBJECT POSTURE ESTIMATION METHOD, AND MOBILE OBJECT POSTURE ESTIMATION APPARATUS

(71) Applicants: TOYOTA JIDOSHA KABUSHIKI KAISHA, Toyota (JP); Kurusugawa Computer Inc., Nagoya (JP)

(72) Inventors: Aya Hamajima, Sunto-gun (JP); Yusuke Nakano, Nagoya (JP); Katsunori Nakanishi, Nagoya (JP); Youhei Yamaguchi, Nagoya (JP)

(73) Assignees: TOYOTA JIDOSHA KABUSHIKI KAISHA, Toyota (JP); Kurusugawa Computer Inc., Nagoya (JP)

( * ) Notice: Subject to any disclaimer, the term of this patent is extended or adjusted under 35 U.S.C. 154(b) by 369 days.

(21) Appl. No.: 17/871,216

(22) Filed: Jul. 22, 2022

(65) Prior Publication Data
US 2023/0021591 A1    Jan. 26, 2023

(30) Foreign Application Priority Data
Jul. 26, 2021 (JP) ................................. 2021-121548

(51) Int. Cl.
*G06K 9/00* (2022.01)
*B60W 40/12* (2012.01)
*G06V 20/58* (2022.01)

(52) U.S. Cl.
CPC ............. *G06V 20/58* (2022.01); *B60W 40/12* (2013.01); *B60W 2420/403* (2013.01); *B60W 2554/4041* (2020.02)

(58) Field of Classification Search
CPC ................................ G06V 20/58; G06V 10/82
See application file for complete search history.

(56) References Cited

U.S. PATENT DOCUMENTS

2020/0341466 A1* 10/2020 Pham ..................... G08G 1/166

FOREIGN PATENT DOCUMENTS

| CN | 108550176 A | * | 9/2018 | ......... G06K 9/00248 |
| CN | 110168477 A | * | 8/2019 | ....... G06F 18/24133 |

(Continued)

OTHER PUBLICATIONS

Brazil et al., "M3D-RPN: Monocular 3D Region Proposal Network for Object Detection", Proceedings of the IEEE/CVF International Conference on Computer Vision(ICCV), 2019, 10 pages.

(Continued)

*Primary Examiner* — Molly Wilburn
*Assistant Examiner* — Aidan Keup
(74) *Attorney, Agent, or Firm* — Oblon, McClelland, Maier & Neustadt, L.L.P.

(57) ABSTRACT

A model generation method includes specifying image coordinates that fall within a two-dimensional image obtained by capturing at least a mobile object and that correspond to at least one point among vertexes of a rectangular shape formed when an outer shape of the mobile object viewed from above is projected on a road, as a key point of the mobile object, and creating the two-dimensional image, to which information on the key point is added, as training data, and generating a machine learning model that outputs the key point from a two-dimensional image obtained by capturing at least a mobile object, by performing machine learning using the training data.

5 Claims, 10 Drawing Sheets

(56) References Cited

FOREIGN PATENT DOCUMENTS

| CN | 111967360 A | * | 11/2020 | | |
|---|---|---|---|---|---|
| JP | 6474179 B2 | | 2/2019 | | |
| WO | WO-2020244653 A1 | * | 12/2020 | ......... | G06F 18/2413 |
| WO | WO-2022179016 A1 | * | 9/2022 | ........... | G06F 18/214 |

OTHER PUBLICATIONS

Wang. Chao et al. "3D-like Bounding Box for Vehicle Detection." 2019 34rd Youth Academic Annual Conference of Chinese Association of Automation (YAC) IEEE, 2019, 6 pages.

* cited by examiner

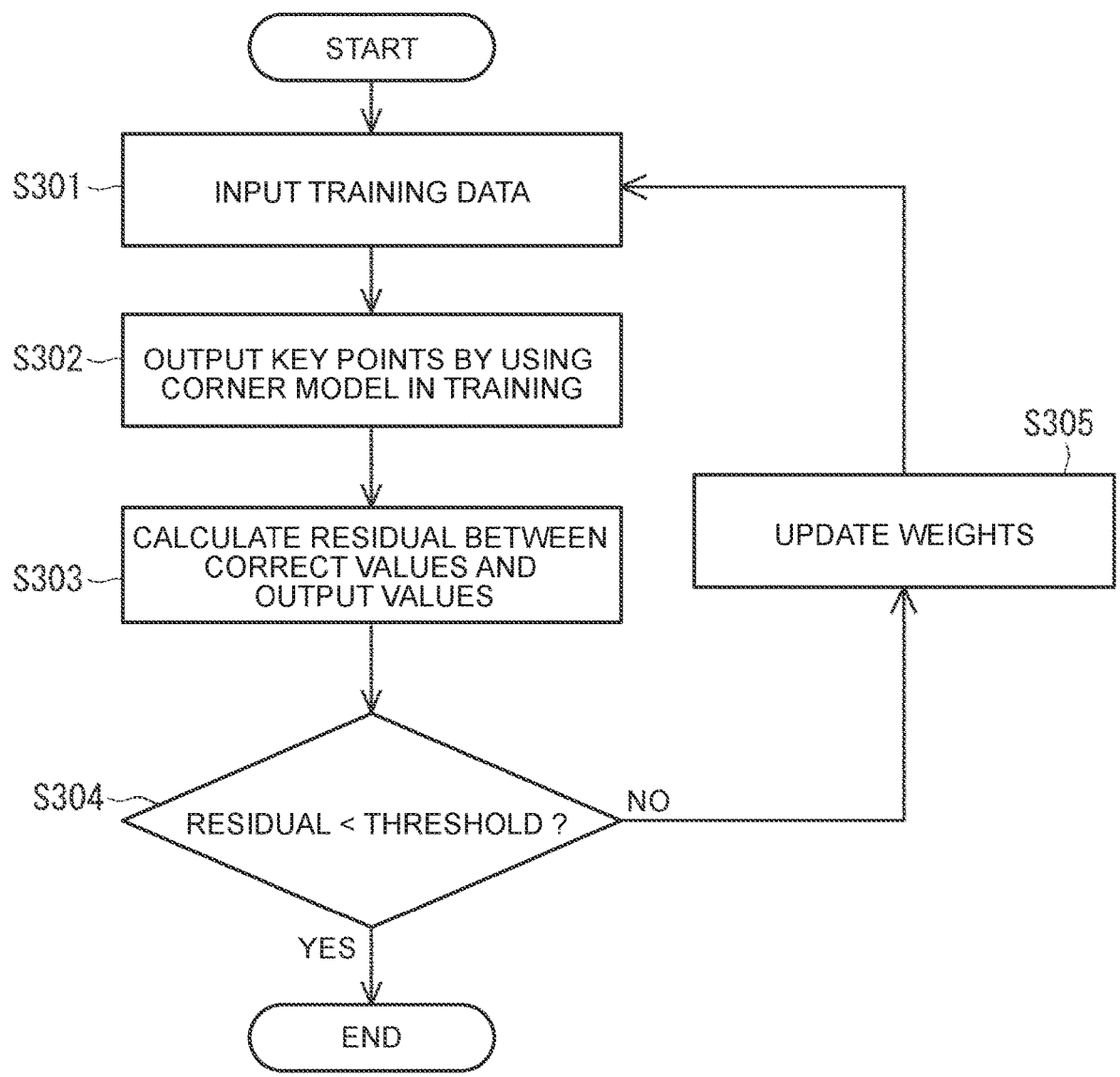

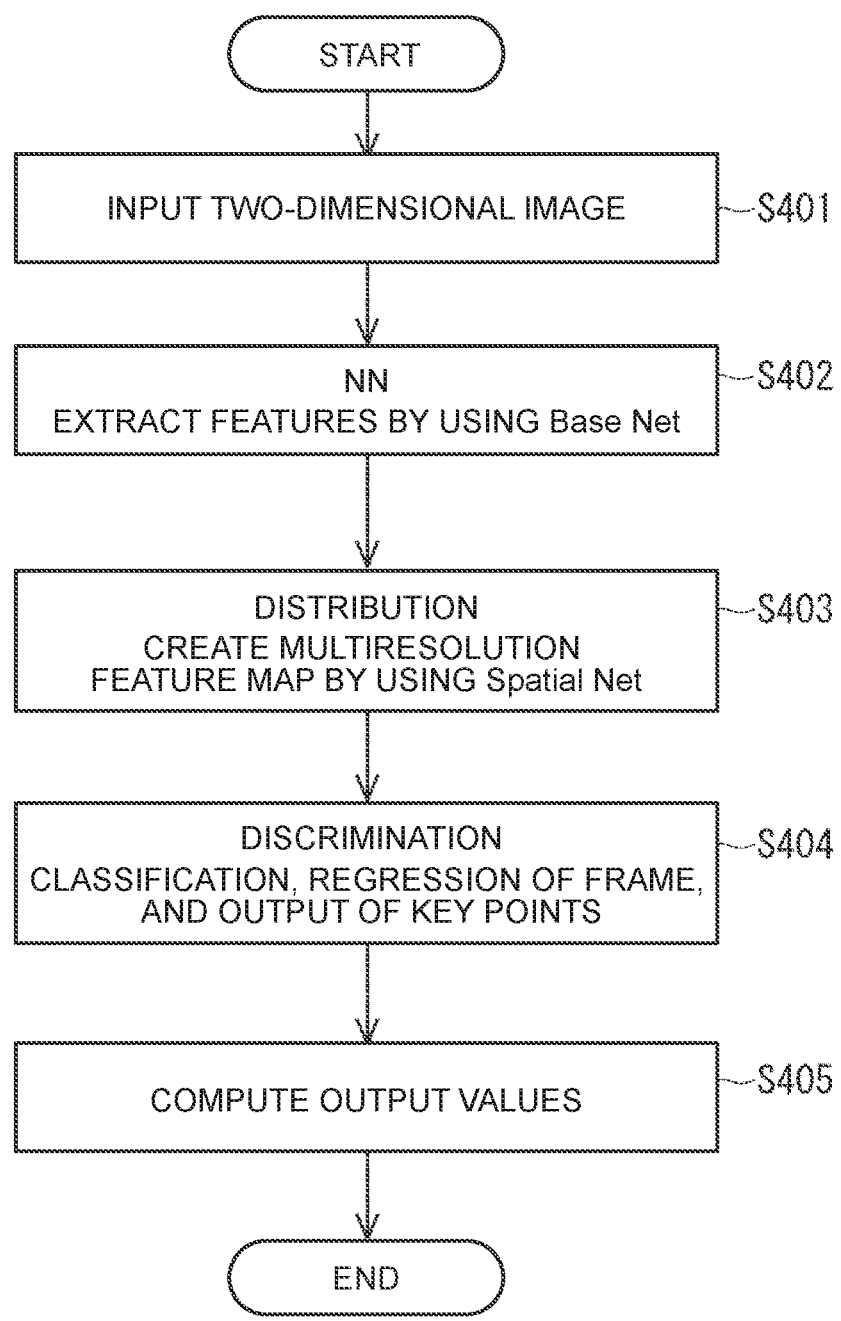

MODEL GENERATION METHOD, MODEL GENERATION APPARATUS, NON-TRANSITORY STORAGE MEDIUM, MOBILE OBJECT POSTURE ESTIMATION METHOD, AND MOBILE OBJECT POSTURE ESTIMATION APPARATUS

CROSS-REFERENCE TO RELATED APPLICATION

This application claims priority to Japanese Patent Application No. 2021-121548 filed on Jul. 26, 2021, incorporated herein by reference in its entirety.

BACKGROUND

1. Technical Field

The present disclosure relates to a model generation method, a model generation apparatus, a non-transitory storage medium, a mobile object posture estimation method, and a mobile object posture estimation apparatus.

2. Description of Related Art

In recent years, various technologies for detecting an object, such as a vehicle, have been developed. For example, Garrick Brazil, and one other, "M3D-RPN: Monocular 3D Region Proposal Network for Object Detection", Proceedings of the IEEE/CVF International Conference on Computer Vision (ICCV), 2019, p. 9287 to 9296 describes that training data is created by comparing a two-dimensional image acquired by a monocular camera with distance information (point group data) that is three-dimensional data and acquired by LiDAR to create a machine learning model that detects a vehicle.

SUMMARY

In Garrick Brazil, and one other, "M3D-RPN: Monocular 3D Region Proposal Network for Object Detection", Proceedings of the IEEE/CVF International Conference on Computer Vision (ICCV), 2019, p. 9287 to 9296, training data is created by comparing two-dimensional data with three-dimensional data, so there is a possibility that an enormous amount of time is required to collect sufficient training data. In addition, since three-dimensional data is used, there is a possibility that an operation time to create a machine learning model also becomes enormous.

The present disclosure provides a model generation method, a model generation apparatus, a non-transitory storage medium, a mobile object posture estimation method, and a mobile object posture estimation apparatus capable of further easily creating a machine learning model for detecting a mobile object.

A first aspect of the present disclosure provides a model generation method. The model generation method includes specifying image coordinates that fall within a two-dimensional image obtained by capturing at least a mobile object and that correspond to at least one point among vertexes of a rectangular shape formed when an outer shape of the mobile object viewed from above is projected on a road, as a key point of the mobile object, and creating the two-dimensional image, to which information on the key point is added, as training data, and generating a machine learning model that outputs the key point from a two-dimensional image obtained by capturing at least a mobile object, by performing machine learning using the training data.

A second aspect of the present disclosure provides a model generation apparatus. The model generation apparatus includes a processor. The processor is configured to specify image coordinates that fall within a two-dimensional image obtained by capturing at least a mobile object and that correspond to at least one point among vertexes of a rectangular shape formed when an outer shape of the mobile object viewed from above is projected on a road, as a key point of the mobile object, and create the two-dimensional image, to which information on the key point is added, as training data, and generate a machine learning model that outputs the key point from a two-dimensional image obtained by capturing at least a mobile object, by performing machine learning using the training data.

A third aspect of the present disclosure provides a non-transitory storage medium. The non-transitory storage medium stores instructions that are executable by one or more processors and that cause the one or more processors to perform functions. The functions include specifying image coordinates that fall within a two-dimensional image obtained by capturing at least a mobile object and that correspond to at least one point among vertexes of a rectangular shape formed when an outer shape of the mobile object viewed from above is projected on a road, as a key point of the mobile object, and creating the two-dimensional image, to which information on the key point is added, as training data, and generating a machine learning model that outputs the key point from a two-dimensional image obtained by capturing at least a mobile object, by performing machine learning using the training data.

A fourth aspect of the present disclosure provides a mobile object posture estimation method. The mobile object posture estimation method includes inferring the key point of a mobile object from a two-dimensional image obtained by capturing at least the mobile object by using the machine learning model generated by the above-described model generation method, and performing an operation over the key point to estimate a posture of the mobile object.

A fifth aspect of the present disclosure provides a mobile object posture estimation apparatus. The mobile object posture estimation apparatus includes a processor. The processor is configured to infer the key point of a mobile object from a two-dimensional image obtained by capturing at least the mobile object by using the machine learning model generated by the above-described model generation method, and perform an operation over the key point to estimate a posture of the mobile object.

In the first to fifth aspects, four vertexes of the rectangular shape may be specified as the key points of the mobile object.

In the first to fifth aspects, image coordinates of two or more points among the vertexes of the rectangular shape may be specified as the key points of the mobile object, and the key points in the two-dimensional image may be specified in predetermined order.

In the first to fifth aspects, the mobile object may be a vehicle, and the key points may be specified such that ground contact positions of wheels on at least one of right and left sides of the vehicle are aligned along a line connecting the two key points located front and rear in at least one of the right and left sides of the vehicle.

In the first to fifth aspects, the machine learning model may have a neural network structure including a Base Net configured to extract features from the two-dimensional image, a Spatial Net configured to create a multiresolution feature map by performing multiresolution analysis on the features, and a discriminator configured to output the key point based on the multiresolution feature map.

With the model generation method, the model generation apparatus, the non-transitory storage medium, the mobile object posture estimation method, and the mobile object posture estimation apparatus, training data is able to be created only by using a two-dimensional image obtained by capturing at least a mobile object. In other words, training data is able to be created without using three-dimensional data of LiDAR or the like. Therefore, in comparison with the case where three-dimensional data is used, it is possible to reduce a time to collect training data. Since three-dimensional data is not used, it is possible to reduce an operation time to create a machine learning model. Thus, it is possible to provide a model generation method, a model generation apparatus, a non-transitory storage medium, a mobile object posture estimation method, and a mobile object posture estimation apparatus capable of further easily creating a machine learning model for detecting a mobile object.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 9 is a flowchart showing a process of generating a corner model according to the first embodiment of the present disclosure; and FIG. 10 is a flowchart showing a mobile object posture estimation process according to the first embodiment of the present disclosure.

DETAILED DESCRIPTION OF EMBODIMENTS

First Embodiment

Hereinafter, a first embodiment of the present disclosure will be described with reference to the accompanying drawings. However, an applicable embodiment of the present disclosure is not limited to the first embodiment. For clear illustration, the following description and drawings are simplified as needed.

Figure 1:
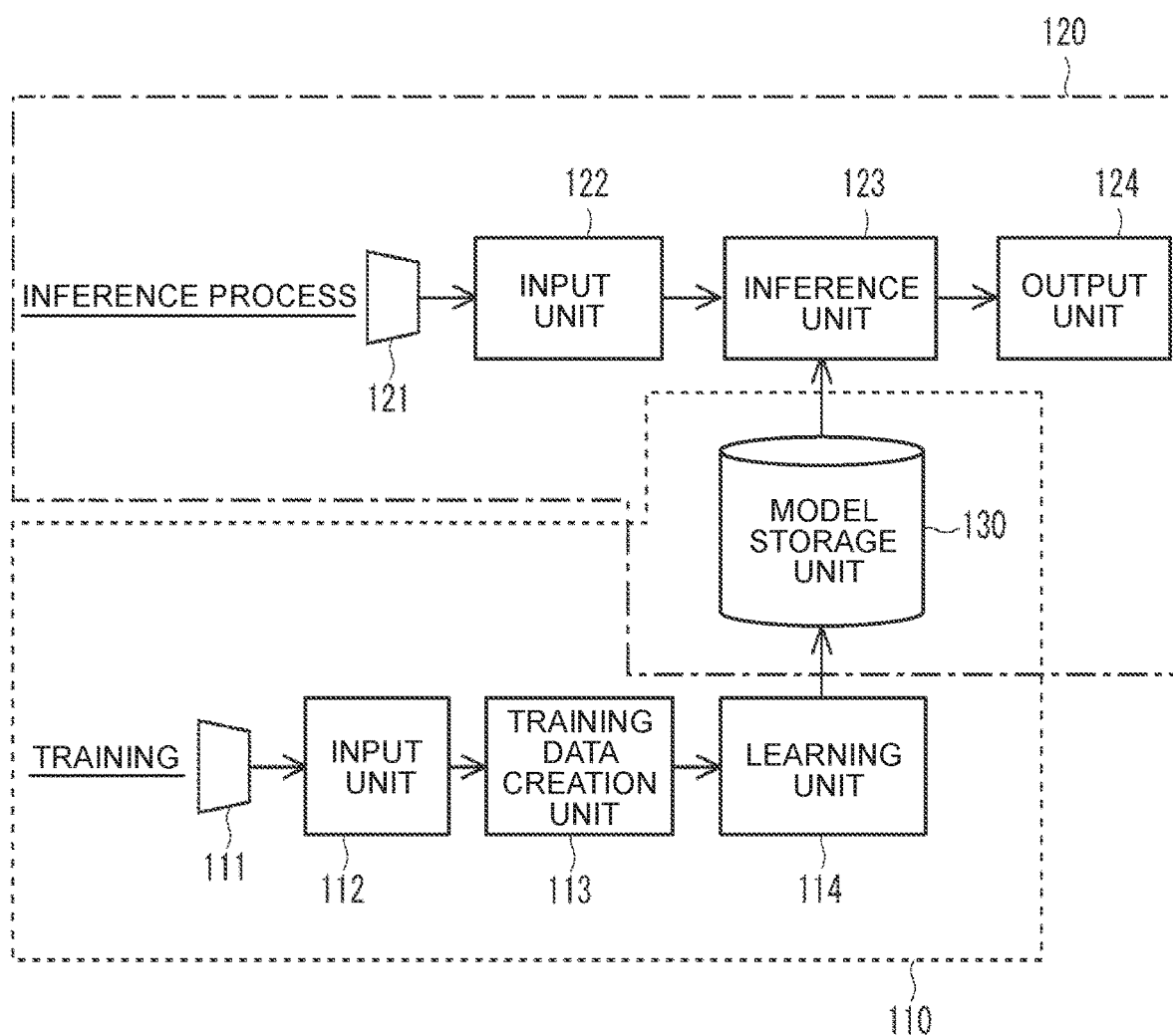
FIG. 1 is a block diagram showing an example of the configuration of a mobile object posture estimation apparatus according to a first embodiment of the present disclosure.

FIG. 1 is a block diagram showing an example of the configuration of a mobile object posture estimation apparatus 100 according to the first embodiment. As shown in FIG. 1, the mobile object posture estimation apparatus 100 includes a model generation block 110 and an inference block 120. The model generation block 110 functions as a model generation apparatus. The model generation block 110 includes an image acquisition device 111, an input unit 112, a training data creation unit 113, a learning unit 114, a model storage unit 130, and the like. The inference block 120 includes an image acquisition device 121, an input unit 122, an inference unit 123, an output unit 124, the model storage unit 130, and the like. In other words, the model generation block 110 and the inference block 120 share the model storage unit 130. The mobile object posture estimation apparatus 100 outputs key points of a mobile object to estimate the posture of the mobile object from a two-dimensional image acquired by the image acquisition device 121, by using a corner model (machine learning model). The corner model (machine learning model) is generated through machine learning by the model generation block 110 in advance.

Figure 2:
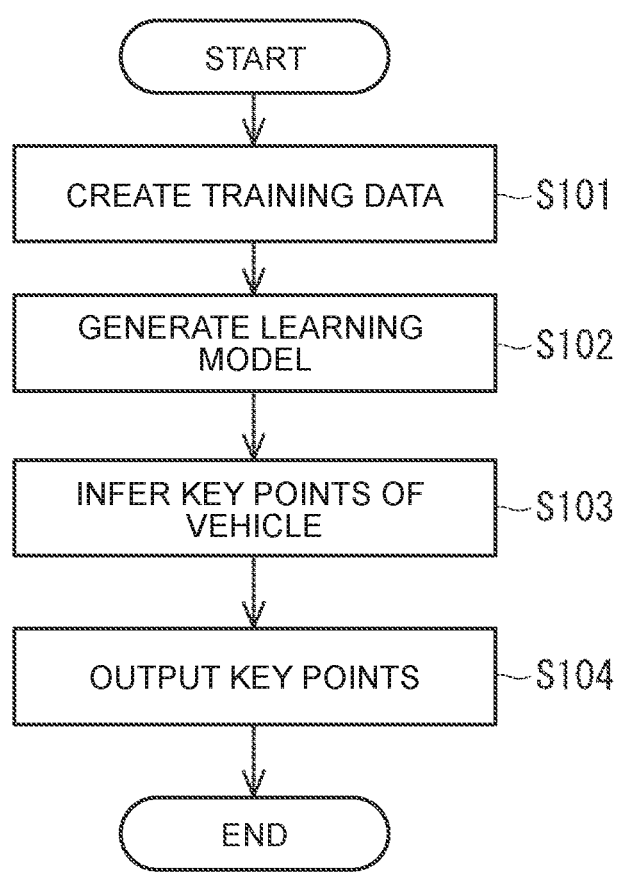
FIG. 2 is a flowchart showing a mobile object posture estimation method according to the first embodiment of the present disclosure.

FIG. 2 is a flowchart showing a mobile object posture estimation method according to the first embodiment. As shown in FIG. 2, initially, the model generation block 110 creates training data (step S101; training data creation step). Subsequently, the model generation block 110 performs machine learning by using the training data to generate a corner model that outputs key points of a mobile object to estimate the posture of the mobile object from a two-dimensional image (step S102; model generation step). After that, the inference block 120 infers key points of a mobile object from a two-dimensional image acquired by the image acquisition device 121 by using the corner model (step S103; inference step). Then, the inference block 120 executes a predetermined operation process on the key points (image coordinates) and outputs the processed key points (step S104; output step). Hereinafter, the model generation block 110 and the inference block 120 will be described in detail.

Configuration of Model Generation Block 110

The image acquisition device 111 is a camera that acquires a two-dimensional image obtained by capturing a scene including at least a mobile object, that is, for example, a traffic flow monitoring camera that captures an image on a road. The image acquisition device 111 inputs a plurality of two-dimensional images to the input unit 112.

The input unit 112 executes a process to obtain image data suitable for processes in the training data creation unit 113 and the learning unit 114 on the two-dimensional images input from the image acquisition device 111. For example, the input unit 112 executes a process of adjusting data size by adjusting the resolution of each of the two-dimensional images, a process of making it easy to extract features, such as edge enhancement, a process of determining the range on which no process is to be executed, and the like. The input unit 112 inputs the processed two-dimensional images to the training data creation unit 113 and the learning unit 114.

The training data creation unit 113 creates training data in which information on key points of a mobile object to estimate the posture of the mobile object is added to each of the two-dimensional images input from the input unit 112.

Figure 3:
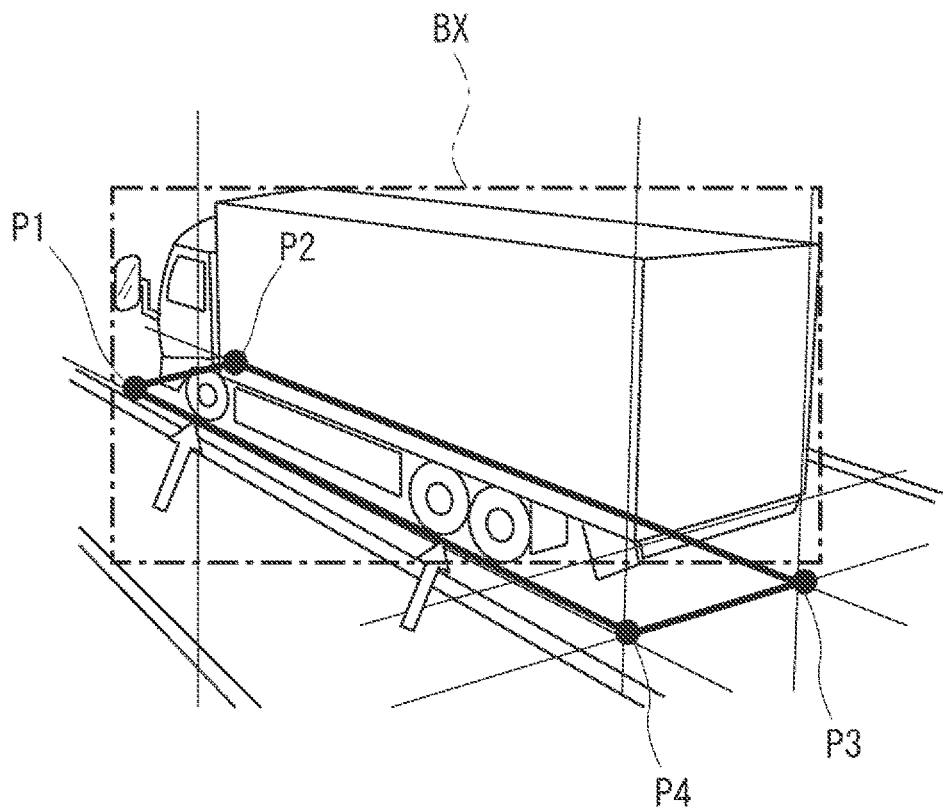
FIG. 3 is a diagram schematically showing a bounding box and key points according to the first embodiment of the present disclosure.

Specifically, the training data creation unit 113 creates a general bounding box on a two-dimensional image. Here, a bounding box is a rectangular frame that surrounds the region of an object (object region) contained in the two-dimensional image. FIG. 3 schematically shows a bounding box BX and key points P1, P2, P3, P4, created by the training data creation unit 113. In the example shown in FIG. 3, there is an image region of a truck of which the image is captured from behind and to the left on the two-dimensional image, and the bounding box BX (represented by the alternate long and short dashed line in FIG. 3) that surrounds the image region of the truck is created. Creating a bounding box may be performed with a technology to create a known bounding box, such as an object recognition technology to recognize an object on a two-dimensional image. Creating a bounding box may be performed manually by an operator who operates the mobile object posture estimation apparatus 100. In addition, the operator may correct a created bounding box by the training data creation unit 113 running a known object recognition algorithm.

Subsequently, the training data creation unit 113 assigns a tag of a class (hereinafter, referred to as "class tag"), indicating which class (for example, a passenger vehicle, a truck, a pedestrian, a bicycle, a motorcycle, or the like) the object belongs to, to an object in each bounding box. Assignment of a class tag may be performed manually by an operator who operates the mobile object posture estimation apparatus 100 or may be performed by the training data creation unit 113 running an algorithm to assign a known class tag. A class tag may further include further detailed information. For example, a class tag may, when the image of only part of an object is captured in a two-dimensional image, may include the ratio (subjective numeric value) of a the captured part to the entire object. A class tag may, when the images of objects are captured overlappingly in a two-dimensional image, include the ratio (subjective numeric value) of a part of one object hidden by another object to the entire part of the one object.

Subsequently, the training data creation unit 113 specifies the key points of an object, to which a class tag indicating a mobile object, such as a pedestrian, a passenger vehicle, a truck, a bicycle, and a motorcycle, is assigned, among objects each surrounded by a bounding box. Specifically, the training data creation unit 113 specifies image coordinates of each of the vertexes of a rectangular shape formed when the outer shape of a mobile object at the time when an object to which a class tag indicating the mobile object is assigned (hereinafter, simply referred to as "mobile object") is viewed from above is projected on a road, as key points of the mobile object. Here, image coordinates are coordinates for indicating the position of a pixel on a two-dimensional image and are, for example, coordinates where the center of a pixel at the leftmost and uppermost position of the two-dimensional image is defined as an origin, a right and left direction or a horizontal direction is defined as an x direction, and an up and down direction or a vertical direction is defined as a y direction. When a mobile object is viewed from above, the outer shape of the mobile object is not strictly limited to a rectangular shape; however, for example, a substantially minimum rectangular shape that includes the outer shape of a mobile object viewed from above is set to a rectangular shape in specifying key points. The training data creation unit 113 may use a deep learning network created by performing machine learning in advance to create the rectangular shape. Creating a rectangular shape may be performed manually by an operator who operates the mobile object posture estimation apparatus 100. The operator may correct the rectangular shape created by the training data creation unit 113. For a mobile object other than a pedestrian, a bicycle, and a motorcycle, the training data creation unit 113 may specify image coordinates of four vertexes of the rectangular shape as four key points. Of mobile objects, for a bicycle and a motorcycle, the training data creation unit 113 may specify two sets of image coordinates, that is, a front-side one point and a rear-side one point corresponding to the front-side one point, among the vertexes of the rectangular shape, as key points. In other words, of mobile objects, for a bicycle and a motorcycle, only two key points are specified. Of mobile objects, for a pedestrian, the training data creation unit 113 may specify one point that is the central point of a substantially circular shape obtained when a head of a pedestrian viewed from above is projected on a road, as a key point and may specify two points that are points obtained when toes of the pedestrian viewed from above are projected on a road as, key points. The training data creation unit 113 may specify one point among the vertexes of a substantially minimum rectangular shape that includes the outer shape of a pedestrian viewed from above, as a key point. Regardless of the type of a mobile object, the training data creation unit 113 may specify only a selected one point among four vertexes of a rectangular shape formed when the outer shape of the mobile object is projected on a road, as a key point. In the example shown in FIG. 3, a rectangular shape (represented by the wide continuous line in FIG. 3) is formed on a road, and image coordinates of the vertexes of the rectangular shape are specified as key points P1, P2, P3, P4. Thus, since image coordinates of pixels on a road in a two-dimensional image are specified as key points, the area of a mobile object that occupies a road surface is able to be calculated from a rectangular shape defined by four key points, so it is possible to estimate the size of the mobile object. Specifically, a transformation matrix (homography matrix) is obtained by calibration between physical coordinates (ortho coordinates) of a landmark point on a road and image coordinates, and the image coordinates of each of four key points are converted to ortho coordinates, with the result that it is possible to estimate the size of the mobile object. Ortho coordinates are image coordinates in an ortho image.

The training data creation unit 113 specifies key points in predetermined order at the time of specifying the key points. In the example shown in FIG. 3, key points are specified in order of the left front P1, right front P2, right rear P3, and left rear P4 of the mobile object. Here, since the image of the truck shown in FIG. 3 is captured from behind and to the left, the right front key point P2 is an estimated position. Thus, it is possible to estimate the direction (posture) of a mobile object from information on the order in which key points are specified. When the mobile object is a bicycle or a motorcycle, the vertexes of a rectangular shape formed when the outer shape of the bicycle or motorcycle is projected on a road may be specified in order of the front-side one point and the rear-side one point corresponding to the front-side one point. Thus, it is possible to estimate the direction (posture) of a bicycle or motorcycle from information on the order in which key points are specified.

The training data creation unit 113 may, when the mobile object is a vehicle (except a bicycle or a motorcycle), specify key points such that ground contact positions of wheels located on at least one of the right and left sides of the mobile object are aligned along a line connecting the two key points located front and rear on at least one of the right and left sides of the mobile object. Thus, it is possible to estimate the location of the mobile object based on the location information of an image capturing range of the image acquisition device 121 and image coordinates of key points in the captured two-dimensional image. Specifically, a transformation matrix (homography matrix) is obtained by calibration between physical coordinates (ortho coordinates) of a landmark point on a road and image coordinates, and the image coordinates of each of four key points are converted to ortho coordinates, with the result that it is possible to estimate the location of a mobile object. It is also possible to estimate the traveling direction of a mobile object from a time change in the direction of the mobile object and the location of the mobile object.

The training data creation unit 113 inputs a two-dimensional image, to which with information on the image coordinates of each of the vertexes of a bounding box, a class tag, and key points (image coordinates) is added, to the learning unit 114 as training data.

Figure 4:
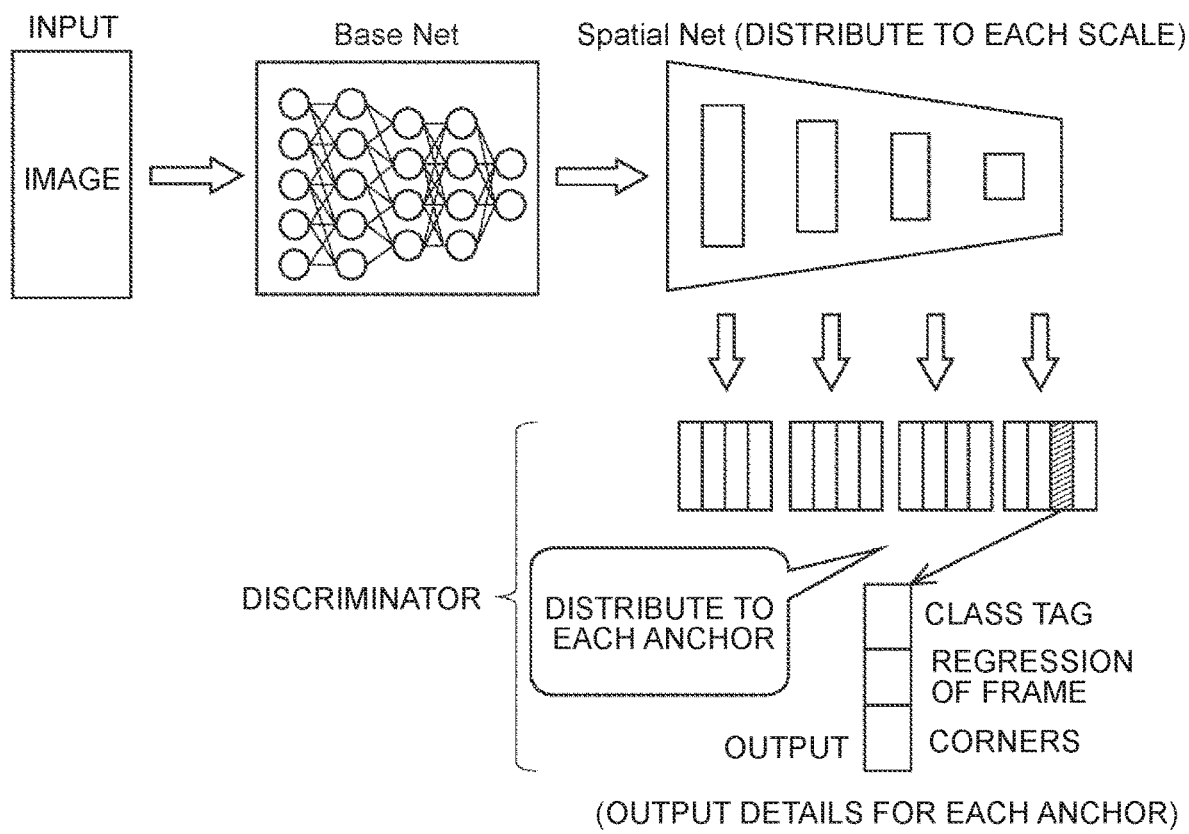
FIG. 4 is a diagram showing a neural network structure of a corner model according to the first embodiment of the present disclosure.

The learning unit 114 performs machine learning by using the training data input from the training data creation unit 113, and a corner model before training or in training, and generates a trained corner model. Here, a corner model is a machine learning model that outputs key points from a two-dimensional image. FIG. 4 shows a neural network structure of a corner model. As shown in FIG. 4, the corner model has a neural network structure including a Base Net configured to extract features from a two-dimensional image, a Spatial Net configured to create a multiresolution feature map by performing multiresolution analysis on the features, and a discriminator configured to output the key points based on the multiresolution feature map.

Figure 5:
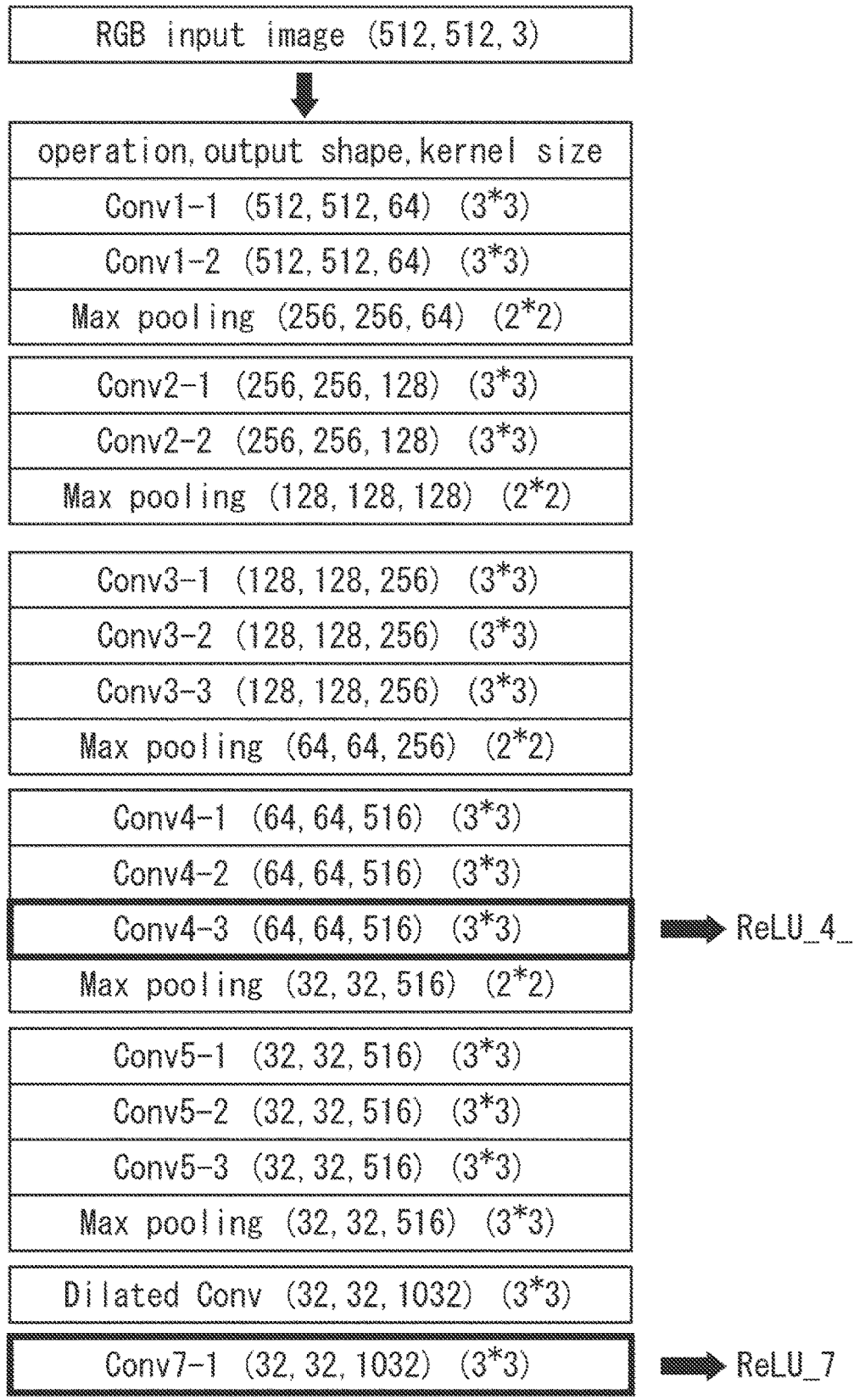
FIG. 5 is a view illustrating a computation using VGG16 that is an example of a Base Net according to the first embodiment of the present disclosure.

Initially, the learning unit 114 extracts features from a two-dimensional image input from the input unit 112 by using the Base Net shown in FIG. 4. Here, the learning unit 114 extracts a plurality of features from the two-dimensional image. A neural network, such as VGG16, Res Net, and Efficient Net, may be used as the Base Net. Here, an example in which VGG16 is used as the Base Net will be described. Specifically, the learning unit 114 repeatedly performs a convolution operation and a pooling operation on a two-dimensional image input from the input unit 112 by using VGG16 to extract features. Here, a convolution operation is an operation to apply a local filter to the two-dimensional image, and a pooling operation is an operation to reduce an image size. FIG. 5 shows an example of an operation using VGG16. In FIG. 5, Conv1-1, Conv1-2, Conv2-1, Conv2-2, Conv3-1, . . . represent a convolution operation, and Maxpooling represents a pooling operation. Then, for example, Conv4-3(64,64,516)(3*3) means an operation to generate a 516-channel image with 3*3 local filters for 64*64 image size. After the operation, the learning unit 114 generates a feature map as features by applying a Rectified Linear Unit (ReLU) function as an activation function to each of pixel values of the generated image. For example, in FIG. 5, ReLU_4_3 means an operation to generate a feature map by applying a ReLU function to a 516-channel image generated by computing Conv4-3(64,64,516)(3*3). Similarly, in FIG. 5, ReLU_7 means an operation to generate a feature map by applying a ReLU function to a 1032-channel image generated by computing Conv7-1(32,32,1032)(3*3). Here, a ReLU function is, for example, a piecewise linear function expressed by the following mathematical expression (1).

$$\varphi(x) = \begin{cases} x & (x > 0) \\ 0 & (x \le 0) \end{cases} \quad (1)$$

Figure 6:
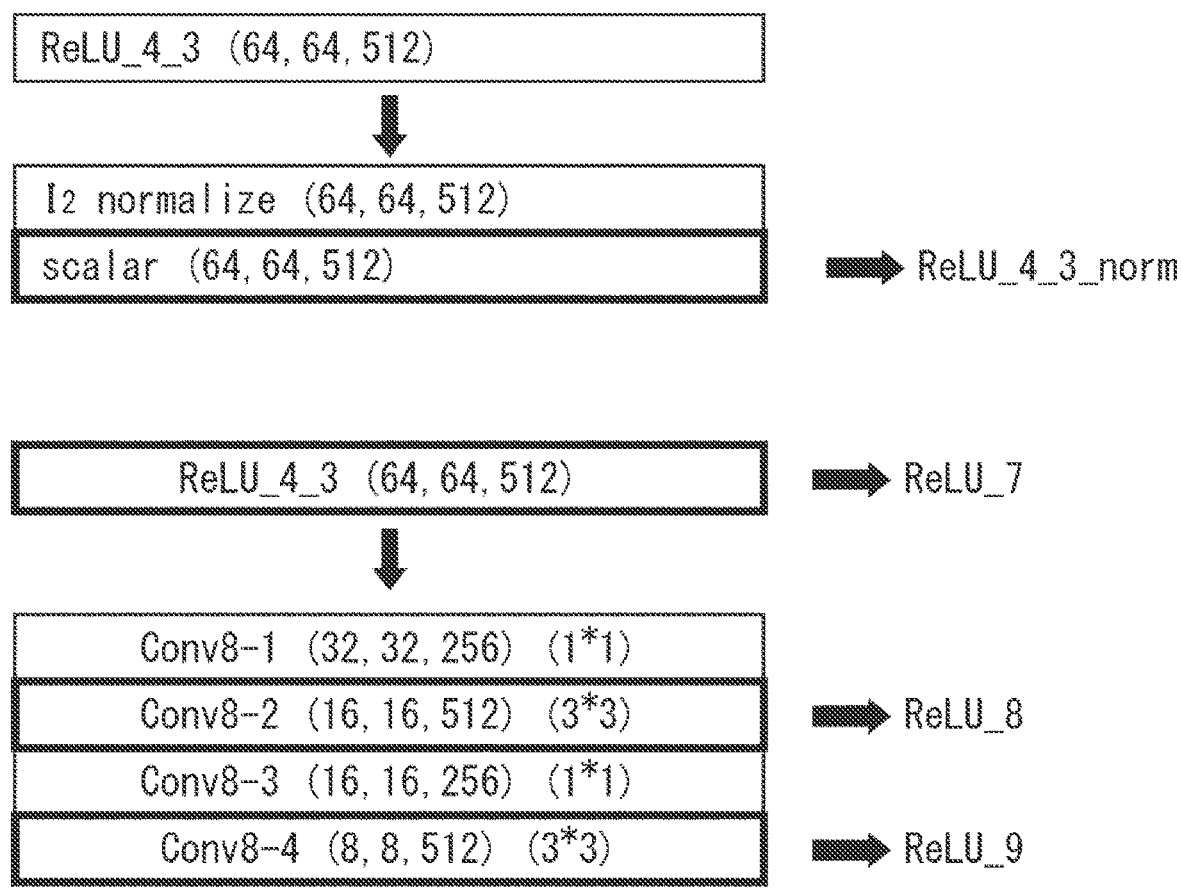
FIG. 6 is view illustrating an example of a computation using a Spatial Net according to the first embodiment of the present disclosure.

Subsequently, the learning unit 114 performs multiresolution analysis by using the Spatial Net shown in FIG. 4, and creates a multiresolution feature map based on the features extracted from the two-dimensional image. Specifically, the learning unit 114 distributes the extracted features (feature map) for each scale in the multiresolution analysis to create a multiresolution feature map. FIG. 6 shows an example of an operation using a Spatial Net. As shown in FIG. 6, the Spatial Net is a neural network that repeatedly performs a convolution operation (Conv8-1, Conv8-2, Conv8-3, Conv8-4) to generate a multiresolution feature map for supporting a change in image size. Here, a "multiresolution feature map" means a plurality of feature maps having different resolutions, generated by reducing the resolution of a feature map in a stepwise manner. Each of the feature maps included in a multiresolution feature map is also referred to as "layer". A "scale" means the resolution of each feature map. The phrase "distribute a feature map for each scale" means that a feature map is broken down for each resolution by gradually reducing the resolution to half. For example, in FIG. 6, ReLU_8 means an operation to apply a ReLU function to a 512-channel image generated by computing Conv8-1(32,32,256)(1*1) and Conv8-2(16,16,512)(3*3) on ReLU_4_3(64,64,512) that is the output of the Base Net to generate a feature map of which the resolution is reduced by two levels. For example, in FIG. 6, ReLU_8 means an operation to apply a ReLU function to a 512-channel image generated by computing Conv8-1(32,32,256)(1*1) and Conv8-2(16,16,512)(3*3) on ReLU_4_3 (64,64,512) that is the output of the Base Net to generate a feature map of which the resolution is reduced by four levels. In FIG. 6, ReLU_7 means to generate a feature map without performing a convolution operation on ReLU_4_3(64,64,512) that is the output of the Base Net, that is, a feature map with the resolution unchanged. In FIG. 6, ReLU_4_3 norm means to generate a feature map by executing a normalization process ($l_2$ normalize) on ReLU_4_3 (64,64,512) that is the output of the Base Net. Here, $l_2$ normalize is a process of normalizing the magnitude of a multidimensional vector x to one by dividing the vector x by a Euclidean norm (the root—sum-square value of components: magnitude) of the vector x.

Figure 7:
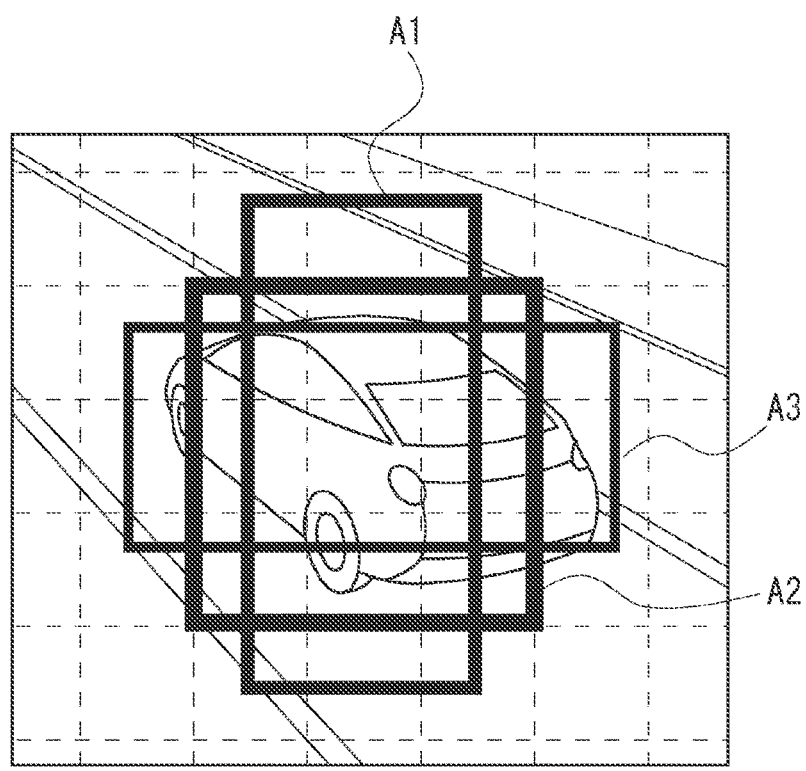
FIG. 7 is a view illustrating anchors according to the first embodiment of the present disclosure.

Subsequently, the learning unit 114 executes a discrimination process based on the multiresolution feature map by using the discriminator and outputs key points. Specifically, the learning unit 114 assigns a class tag and regresses a bounding box (frame) based on the multiresolution feature map as shown in FIG. 4 and outputs the image coordinates of each of the key points (corners). More specifically, the learning unit 114 prepares anchors for each of a plurality of layers (a plurality of feature maps having different resolutions) of the multiresolution feature map. Here, an "anchor" is a template frame according to the shape of a recognized target and is a candidate of a bounding box. The number of set "anchors" varies among the layers. In the example shown in FIG. 7, three rectangular anchors A1, A2, A3 are set for a layer (a feature map with a resolution). For example, the learning unit 114 sets anchors for each of a plurality of layers (ReLU_4_3 norm, ReLU_7, ReLU_8, ReLU_9) with different resolutions, included in the multiresolution feature map output from the Spatial Net. Subsequently, the learning unit 114 assigns a class tag, regresses a bounding box, and detects key points for each anchor. Then, the learning unit 114 outputs the class tag, the regression operation result of the bounding box, and the image coordinates of each of the key points (corners) for each anchor.

After that, the learning unit 114 calculates a residual (difference) by comparing the results (output values) output by executing the discrimination process based on the multiresolution feature map using the discriminator, with training data (correct values). For example, the learning unit 114 calculates a residual by using the following mathematical expression (2).

$$E(w) = E_{focal} + E_{bb} + E_{key1} + E_{key2} + E_{key3} \quad (2)$$

Here, $E_{focal}$ denotes a residual of a class tag, $E_{bb}$ denotes a residual of a bounding box, $E_{key1}$ denotes a residual of four corner points (key points) of a vehicle (except a bicycle or a motorcycle), $E_{key2}$ denotes a residual of two corner points (key points) of a bicycle or a motorcycle, and $E_{key3}$ denotes a residual of one corner point (key point) of a pedestrian. $E_{focal}$, $E_{bb}$, $E_{key1}$, $E_{key2}$, and $E_{key3}$ are respectively calculated by the following mathematical expressions (3), (4), (5), (6), and (7).

$$E_{focal}(w) = \frac{1}{N} \sum_{i,x,y} \left\{ -p_{i,x,y}^{gt} (1-p_{i,x,y})^{\gamma} \log p_{i,x,y} - (1-p_{i,x,y}^{gt}) p_{i,x,y}^{\gamma} \log(1-p_{i,x,y}) \right\} \quad (3)$$

$$E_{bb}(w) = \frac{1}{N} \sum_i \left\{ |xmin_i^{gt} - xmin_i| + |xmax_i^{gt} - xmax_i| + |ymin_i^{gt} - ymin_i| + |ymax_i^{gt} - ymax_i| \right\} \quad (4)$$

$$E_{key1}(w) = \frac{1}{N} \sum_i \sum_{j=1}^{4} \left\{ -z_{ij}^{gt} \log(z_j + \varepsilon) + |x_{ij}^{gt} - x_{ij}| + |y_{ij}^{gt} - y_{ij}| \right\} \quad (5)$$

$$E_{key2}(w) = \frac{1}{N} \sum_i \sum_{j=1}^{2} \left\{ -z_{ij}^{gt} \log(z_j + \varepsilon) + |x_{ij}^{gt} - x_{ij}| + |y_{ij}^{gt} - y_{ij}| \right\} \quad (6)$$

$$E_{key3}(w) = \frac{1}{N} \sum_i \sum_{j=1}^{1} \left\{ -z_{ij}^{gt} \log(z_j + \varepsilon) + |x_{ij}^{gt} - x_{ij}| + |y_{ij}^{gt} - y_{ij}| \right\} \quad (7)$$

In the above mathematical expressions (3), (4), (5), (6), and (7), p denotes the probability of an object class, i denotes an object number, x denotes the horizontal coordinate of image coordinates, y denotes the vertical coordinate of the image coordinates, $p_{i,x,y}$ denotes a class probability of an inference result at a pixel of image coordinates (x,y) in the ith object, z indicates visibility (z=1 when a corner point is visible; z=0 when a corner point is not visible), ε denotes a minute constant that prevents divergence of cross entropy (when z=0, log z=−∞ and diverges, so, for example, ε is set to $10^{-5}$ or the like), and w denotes the high-dimensional vector of weights (for example, coefficients and the like of an optimization convolution filter) of a neural network, a variable with the prefix "gt" is a value (ground truth) of training data, and a variable with no prefix of gt is a function of w. In the above mathematical expressions (5), (6), and (7), the term $$z_{ij}^{gt} \log(z_j + \varepsilon)$$

is not indispensable. In the above mathematical expressions (3), (4), (5), (6), and (7), N indicates the total number of objects to which a class tag is assigned. In the above mathematical expressions (4), (5), (6), and (7), instead of the absolute value sign "|", smooth l1 with which the corner at the origin is rounded may be used. When the corner at the origin is rounded, it becomes differentiable, so, when differentiation of an evaluation function with respect to w is calculated in back propagation of machine learning, it is possible to calculate an inclination at a selected position. Specifically, the difference between simple l1 and smooth l1 is expressed by the following mathematical expressions (8) and (9).

$$\text{smooth\_l1}(x) = \begin{cases} 0.5x^2 & (|x| < 1) \\ |x| - 0.5 & (\text{otherwise}) \end{cases} \quad (8)$$

$$l1(x) = |x| \quad (9)$$

In mathematical terms, l1 (the lower case letter of "L" and one) is used in an Euclidean space, and L1 (the upper case letter of "L" and one) is used in a functional space, and l1 in the smooth l1 is the lower case letter of "L" and one.

Subsequently, the learning unit 114 determines whether the residual is less than a predetermined threshold. When the residual is greater than or equal to the predetermined threshold, the learning unit 114 updates the weights (assigned weights) in the Base Net, the Spatial Net, and the discriminator and then executes the above-described processes again. When the residual is less than the predetermined threshold, the learning unit 114 determines that machine learning has completed, and stores the corner model with the updated weights in the model storage unit 130. The predetermined threshold is a relatively small value that is determined according to the purpose and is, for example, a value less than one. Alternatively, after the learning unit 114 execute the process of step S301, step S302, step S303, step S304, and step S305 shown in FIG. 9 (described later) a predetermined number of times, the learning unit 114 may stop the operation even when the residual is greater than or equal to the predetermined threshold. Thus, a machine-learned corner model is generated.

Configuration of Inference Block 120

The image acquisition device 121, as well as the image acquisition device 111, is a camera that acquires a two-dimensional image obtained by capturing a scene including at least a mobile object, that is, for example, a traffic flow monitoring camera that captures an image on a road. The image acquisition device 121 inputs a plurality of two-dimensional images to the input unit 122.

The input unit 122 executes a process to obtain image data suitable for processes in the inference unit 123 on each two-dimensional image input from the image acquisition device 121. For example, the input unit 122 executes a process of adjusting data size by adjusting the resolution of each two-dimensional image, a process of making it easy to extract features, such as edge enhancement, a process of determining the range on which no process is executed, and the like. The input unit 122 inputs the processed two-dimensional image to the inference unit 123.

The inference unit 123 infers key points from the two-dimensional image input from the input unit 122 by using the corner model stored in the model storage unit 130. The inference unit 123 inputs the inferred key points to the output unit 124.

Specifically, initially, the inference unit 123 extracts features from the two-dimensional image input from the input unit 122 by using the Base Net of the corner model. Here, the inference unit 123 extracts a plurality of features from the two-dimensional image. A process of extracting features from the two-dimensional image by the inference unit 123 is similar to the process of extracting features from the two-dimensional image by the learning unit 114, so a further detailed description is omitted.

Subsequently, the inference unit 123 performs multiresolution analysis by using the Spatial Net of the corner model and distributes a plurality of features extracted from the two-dimensional image to each scale in the multiresolution analysis to create a multiresolution feature map. A process of creating a multiresolution feature map by the inference unit 123 is similar to the process of creating a multiresolution feature map by the learning unit 114, so a further detailed description is omitted.

Subsequently, the inference unit 123 executes a discrimination process based on the multiresolution feature map by using the discriminator and outputs key points. Specifically, the inference unit 123 assigns a class tag and regresses a bounding box (frame) based on the multiresolution feature map and outputs the image coordinates of each of the key points (corners). A process of outputting key points by the inference unit 123 is similar to the process of outputting key points by the learning unit 114, so a further detailed description is omitted.

The output unit 124 performs an operation to estimate the posture of the mobile object over the key points input from the inference unit 123. Specifically, the output unit 124 converts the key points (image coordinates) to values to calculate the size of the mobile object, the direction (posture) of the mobile object, the location of the mobile object, the traveling direction of the mobile object, and the like. Specifically, the output unit 124 obtains a transformation matrix (homography matrix) by calibration between physical coordinates (ortho coordinates) of a landmark point on a road and image coordinates and converts the image coordinates of each of the four key points to ortho coordinates by using the transformation matrix. Thus, it is possible to calculate the size of the mobile object, the direction (posture) of the mobile object, the location of the mobile object, the traveling direction of the mobile object, and the like from the ortho coordinates of each of the four key points.

Model Generation Method

Figure 8:
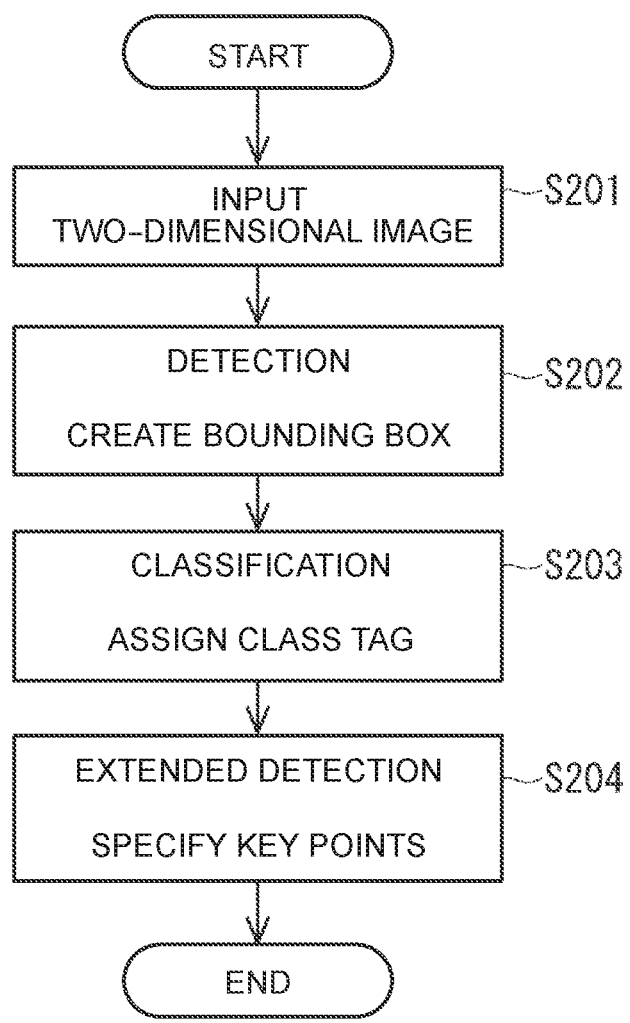
FIG. 8 is a flowchart showing a process of creating training data according to the first embodiment of the present disclosure.

Next, a model generation method according to the first embodiment will be described with reference to FIG. 8 and FIG. 9. FIG. 8 shows a training data creation process that is the process of step S101 shown in FIG. 2. FIG. 9 shows a corner model generation process that is the process of step S102 shown in FIG. 2.

Initially, as shown in FIG. 8, the input unit 112 inputs a two-dimensional image acquired by the image acquisition device 111 to the training data creation unit 113 (step S201).

Subsequently, the training data creation unit 113 creates a bounding box on the two-dimensional image (step S202; detection process). When a plurality of objects is included in the two-dimensional image, the training data creation unit 113 creates a plurality of bounding boxes on the two-dimensional image.

After that, the training data creation unit 113 assigns a class tag to each of the objects in the respective bounding boxes (step S203; classification process).

Then, the training data creation unit 113 specifies key points (image coordinates) of each object to which the class tag indicating the mobile object is assigned (step S204; extended detection process). In the specification, the "detection process" in step S202 means to create a bounding box, and the "extended detection process" in step S204 means to specify key points in addition to a bounding box.

Subsequently, as shown in FIG. 9, training data is input from the training data creation unit 113 to the learning unit 114 (step S301).

After that, the learning unit 114 outputs the key points of the mobile object by using the corner model in training (step S302).

Then, the learning unit 114 calculates a residual by comparing the output values output in step S302 with the training data (correct values) (step S303).

Subsequently, the learning unit 114 determines whether the residual calculated in step S303 is less than a predetermined threshold (step S304).

In step S304, when the residual is greater than or equal to the predetermined threshold (No in step S304), the learning unit 114 updates the weights in the Base Net, the Spatial Net, and the discriminator (step S305) and then returns to the process of step S301.

In step S304, when the residual is less than the predetermined threshold (Yes in step S304), the learning unit 114 determines that machine learning has completed, stores the trained corner model in the model storage unit 130, and ends the process.

Mobile Object Posture Estimation Method

Next, a mobile object posture estimation method according to the first embodiment will be described with reference to FIG. 10. FIG. 10 shows a training data creation process that is the processes of step S103 and step S104 shown in FIG. 2.

Initially, as shown in FIG. 10, the input unit 122 executes a predetermined process on the two-dimensional image input from the image acquisition device 121 and inputs the processed two-dimensional image to the inference unit 123 (step S401).

Subsequently, the inference unit 123 extracts features from the two-dimensional image input in step S401 by using the Base Net of the trained corner model stored in the model storage unit 130 (step S402; feature extraction process).

After that, the inference unit 123 creates a multiresolution feature map by using the Spatial Net of the corner model (step S403; distribution process).

Then, the inference unit 123 assigns a class tag and regresses a bounding box (frame) based on the multiresolution feature map and outputs the image coordinates of each of the key points (corners) by using the discriminator of the corner model (step S404; discrimination process).

Subsequently, the output unit 124 performs an operation to, for example, estimate the posture of the mobile object over the key points (output values) input from the inference unit 123 and ends the process (step S405).

With the model generation method, the model generation block 110 serving as the model generation apparatus, the non-transitory storage medium, the mobile object posture estimation apparatus 100, and the mobile object posture estimation method according to the above-described first embodiment, training data is able to be created only by using a two-dimensional image obtained by capturing at least a mobile object. In other words, training data is able to be created without using three-dimensional data of LiDAR or the like. Therefore, in comparison with the case where three-dimensional data is used, it is possible to reduce a time to collect training data. Since three-dimensional data is not used, it is possible to reduce an operation time to create a machine learning model. Thus, it is possible to provide a model generation method, a model generation apparatus, a non-transitory storage medium, a mobile object posture estimation method, and a mobile object posture estimation apparatus capable of further easily creating a machine learning model for detecting a mobile object.

Image coordinates that fall within a two-dimensional image obtained by capturing at least a mobile object and that correspond to the vertexes of a rectangular shape formed when the outer shape of the mobile object viewed from above is projected on a road are specified as four key points of the mobile object from the two-dimensional image. Therefore, since image coordinates of pixels on a road in a two-dimensional image are specified as key points, the area of a mobile object that occupies a road surface is able to be calculated from a rectangular shape defined by four key points, so it is possible to estimate the size of the mobile object. Thus, even with training data created by using only a two-dimensional image, it is possible to generate a machine learning model capable of detecting a mobile object with accuracy needed for road control or the like.

The training data creation unit 113 specifies key points in predetermined order in specifying the key points. Thus, it is possible to estimate the direction (posture) of a mobile object from information on key points.

When the mobile object is a vehicle (except a bicycle or a motorcycle), the training data creation unit 113 specifies key points such that ground contact positions of wheels located on at least one of the right and left sides of the vehicle are aligned along a line connecting the two key points located front and rear on at least one of the right and left sides of the vehicle. Thus, it is possible to estimate the location of the vehicle based on the location information of an image capturing range of the image acquisition device 121 and image coordinates of key points in the captured two-dimensional image. Thus, it is possible to estimate the traveling direction of a vehicle from a time change in the direction of the vehicle and the location of the vehicle.

A corner model (machine learning model) has a neural network structure including a Base Net configured to extract features from a two-dimensional image, a Spatial Net configured to create a multiresolution feature map by performing multiresolution analysis on the features, and a discriminator configured to output key points based on the multiresolution feature map. Therefore, since the corner model has a relatively simple neural network structure, it is possible to estimate a mobile object and the posture of the mobile object at a speed needed for traffic control or the like.

An applicable embodiment of the present disclosure is not limited to the above-described embodiment and may be modified as needed without departing from the scope of the present disclosure. For example, in the above-described embodiment, the training data creation unit 113 may specify features (end points, center points, and the like) of a three-dimensional object as key points. In this case, it is possible to estimate the location and posture of the object. In the above-described embodiment, when the mobile object is a vehicle (except a bicycle or a motorcycle), the training data creation unit 113 specifies the image coordinates of four vertexes of a rectangular shape as four key points, and, when the mobile object is a bicycle or a motorcycle, the training data creation unit 113 specifies the image coordinates of front and rear two vertexes of a rectangular shape as two key points. Alternatively, the training data creation unit 113 may specify only any one of the four vertexes of the rectangular shape as one key point. In this case as well, it is possible to estimate the posture of a vehicle by combining road information obtained from a traffic flow monitoring camera with the one key point. In other words, when one key point on a mobile object is output by a machine learning model (corner model) generated by the model generation apparatus according to the present embodiment, it is possible to estimate the posture of the mobile object by using road information obtained from a traffic flow monitoring camera. In this case, it is possible to calculate a residual of the corner point (key point) by using the mathematical expression (7). Alternatively, the training data creation unit 113 may specify key points of five points or more including four vertexes of a rectangular shape or five or more points irrespective of the vertexes of the rectangular shape for a mobile object. Furthermore, the number of key points to be specified by the training data creation unit 113 is not limited to the number described in the above embodiment. When the training data creation unit 113 specifies m (m is a positive integer) key points, a residual of the m corner points (key points) is calculated by the following mathematical expression (10).

$$E_{keym}(w) = \frac{1}{N}\sum_{i}\sum_{j=1}^{m}\left\{-z_{ij}^{gt}\log(z_j+\varepsilon)+\left|x_{ij}^{gt}-x_{ij}\right|+\left|y_{ij}^{gt}-y_{ij}\right|\right\} \quad (10)$$

In the mathematical expression (10), m is the number of key points.

In the above-described embodiment, the aspects of the present disclosure have been described as the configuration of hardware; however, the aspects of the present disclosure are not limited thereto. The aspects of the present disclosure may be implemented by causing a central processing unit (CPU) to run a computer program to achieve the procedures described in the flowcharts of FIG. 2, and FIG. 8 to FIG. 10.

The above-described program may be stored in a ROM and supplied to a computer. The above-described program may be stored in a selected one of non-transitory computer readable media of various types and supplied to a computer. The non-transitory computer readable media include tangible storage media of various types. Examples of the non-transitory computer readable media include a magnetic recording medium (such as a flexible disk, a magnetic tape, and a hard disk drive), a magnetooptical recording medium (such as a magneto-optical disk), a CD-read only memory (ROM), a CD-R, a CD-R/W, and a semiconductor memory (such as a mask ROM, a programmable ROM (PROM), an erasable PROM (EPROM), a flash ROM, and a random access memory (RAM)). The program may be supplied to a computer via a selected one of transitory computer readable media of various types. Examples of the transitory computer readable media include an electrical signal, an optical signal, and an electromagnetic wave. Transitory computer readable media are capable of supplying the program to a computer via a wired communication path, such as an electric wire and an optical fiber, or a wireless communication path.

What is claimed is:

1. A method comprising:
   specifying image coordinates that fall within a two-dimensional image obtained by capturing at least a mobile object and that correspond to at least one point among vertexes of a rectangular shape formed when an outer shape of the mobile object viewed from above is projected on a road, as a key point of the mobile object, and creating the two-dimensional image, to which information on the key point is added, as training data; and
   generating a machine learning model that outputs the key point from a two-dimensional image obtained by capturing at least a mobile object, by performing machine learning using the training data, wherein
   image coordinates of two or more points among the vertexes of the rectangular shape are specified as key points of the mobile object,
   the key points in the two-dimensional image are specified in predetermined order, and
   at least one of the key points is in an estimated position, wherein the machine learning model comprises a neural network structure including:
   a Base Net configured to extract features from the two-dimensional image, a Spatial Net configured to create a multiresolution feature map by performing multiresolution analysis on the extracted features, and a discriminator configured to output the key points based on the multiresolution feature map, inferring the key points of a mobile object from a two-dimensional image obtained by capturing at least the mobile object by using the machine learning model; and performing an operation over the key points to estimate a size, a posture, a location, and a traveling direction of the mobile object based on the key points and information on the order in which the key points are specified, wherein the size of the mobile object is estimated by obtaining a transformation matrix through calibration between physical coordinates of a landmark point on a road and image coordinates and converting the image coordinates of the key points to the physical coordinates using the transformation matrix, the location of the mobile object is estimated based on image coordinates of key points and location information of an image capturing range of an image acquisition device, and the traveling direction of the mobile object is estimated from a time change in a direction of the mobile object and the estimated location of the mobile object.

2. The method according to claim 1, wherein four vertexes of the rectangular shape are specified as the key points of the mobile object.

3. The method according to claim 1, wherein:
the mobile object is a vehicle; and
the key points are specified such that ground contact positions of wheels on at least one of right and left sides of the vehicle are aligned along a line connecting the two key points located front and rear in at least one of the right and left sides of the vehicle.

4. An apparatus comprising:
a processor configured to
specify image coordinates that fall within a two-dimensional image obtained by capturing at least a mobile object and that correspond to at least one point among vertexes of a rectangular shape formed when an outer shape of the mobile object viewed from above is projected on a road, as a key point of the mobile object, and creating the two-dimensional image, to which information on the key point is added, as training data, and generate a machine learning model that outputs the key point from a two-dimensional image obtained by capturing at least a mobile object, by performing machine learning using the training data, wherein
image coordinates of two or more points among the vertexes of the rectangular shape are specified as key points of the mobile object,
the key points in the two-dimensional image are specified in predetermined order, and
at least one of the key points is in an estimated position, wherein the machine learning model comprises a neural network structure including:
a Base Net configured to extract features from the two-dimensional image,
a Spatial Net configured to create a multiresolution feature map by performing multiresolution analysis on the extracted features, and a discriminator configured to output the key points based on the multiresolution feature map, infer the key points of a mobile object from a two-dimensional image obtained by capturing at least the mobile object by using the machine learning model; and perform an operation over the key points to estimate a size, a posture, a location, and a traveling direction of the mobile object based on the key points and information on the order in which the key points are specified, wherein the size of the mobile object is estimated by obtaining a transformation matrix through calibration between physical coordinates of a landmark point on a road and image coordinates and converting the image coordinates of the key points to the physical coordinates using the transformation matrix, the location of the mobile object is estimated based on image coordinates of key points and location information of an image capturing range of an image acquisition device, and the traveling direction of the mobile object is estimated from a time change in a direction of the mobile object and the estimated location of the mobile object.

5. A non-transitory storage medium storing instructions that are executable by one or more processors and that cause the one or more processors to perform functions, the functions comprising:

specifying image coordinates that fall within a two-dimensional image obtained by capturing at least a mobile object and that correspond to at least one point among vertexes of a rectangular shape formed when an outer shape of the mobile object viewed from above is projected on a road, as a key point of the mobile object, and creating the two-dimensional image, to which information on the key point is added, as training data; and generating a machine learning model that outputs the key point from a two-dimensional image obtained by capturing at least a mobile object, by performing machine learning using the training data, wherein
image coordinates of two or more points among the vertexes of the rectangular shape are specified as key points of the mobile object,
the key points in the two-dimensional image are specified in predetermined order, and
at least one of the key points is in an estimated position, wherein the machine learning model comprises a neural network structure including:
a Base Net configured to extract features from the two-dimensional image,
a Spatial Net configured to create a multiresolution feature map by performing multiresolution analysis on the extracted features, and
a discriminator configured to output the key points based on the multiresolution feature map, inferring the key points of a mobile object from a two-dimensional image obtained by capturing at least the mobile object by using the machine learning model; and performing an operation over the key points to estimate a size, a posture, a location, and a traveling direction of the mobile object based on the key points and information on the order in which the key points are specified, wherein the size of the mobile object is estimated by obtaining a transformation matrix through calibration between physical coordinates of a landmark point on a road and image coordinates and converting the image coordinates of the key points to the physical coordinates using the transformation matrix, the location of the mobile object is estimated based on image coordinates of key points and location information of an image capturing range of an image acquisition device, and the traveling direction of the mobile object is estimated from a time change in a direction of the mobile object and the estimated location of the mobile object.

* * * * *